Oct. 21, 1952     T. R. SMITH     2,614,869
SPRING-ACTUATED SHAFT SEAL
Filed Nov. 1, 1946     2 SHEETS—SHEET 1
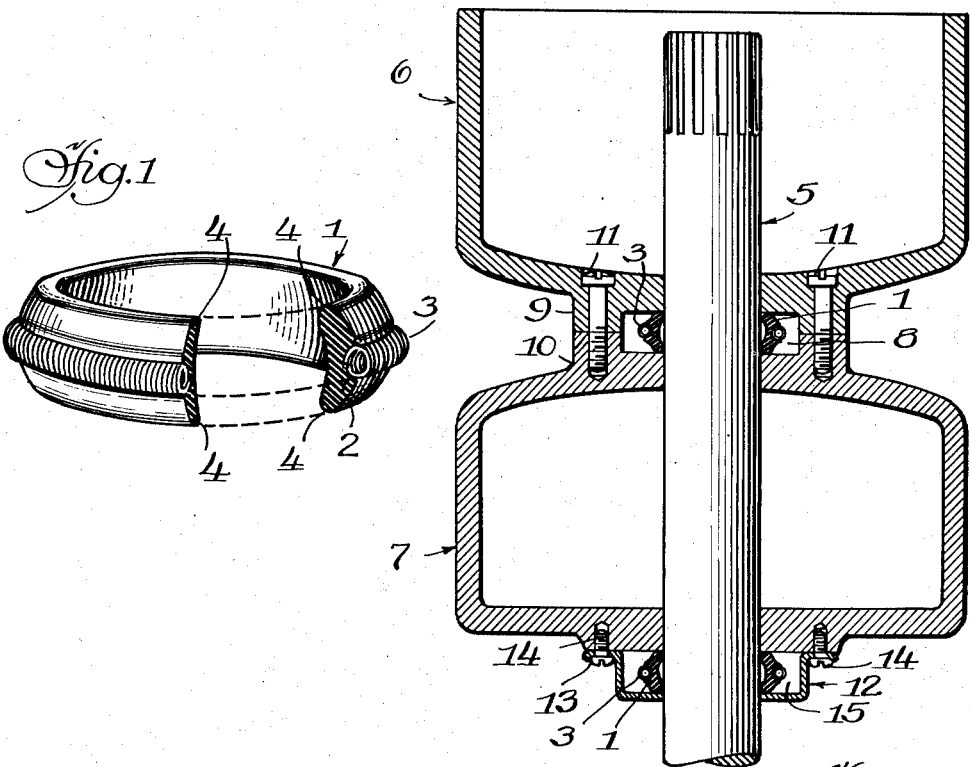
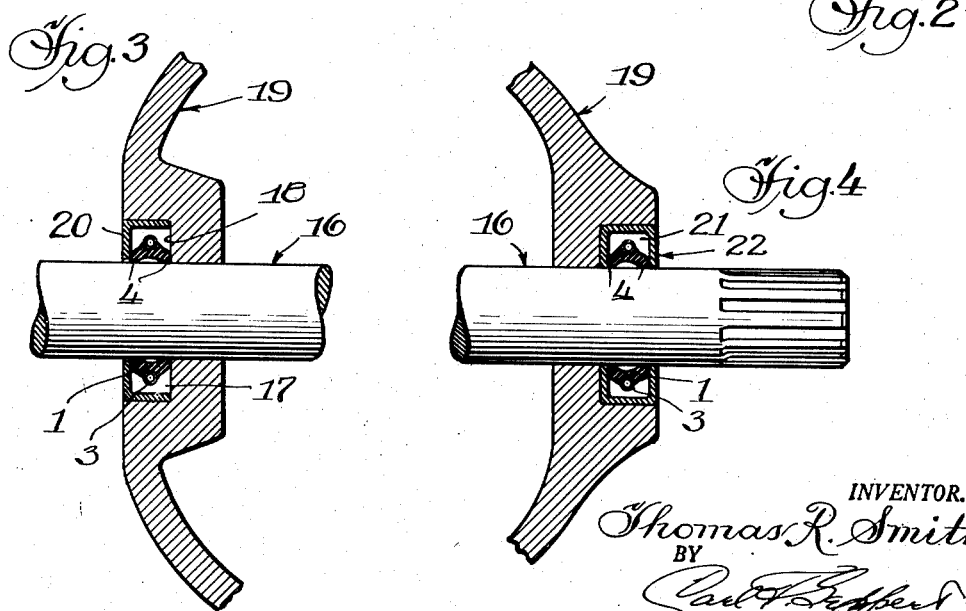
INVENTOR.
Thomas R. Smith Oct. 21, 1952 — T. R. SMITH — 2,614,869
SPRING-ACTUATED SHAFT SEAL
Filed Nov. 1, 1946 — 2 SHEETS—SHEET 2
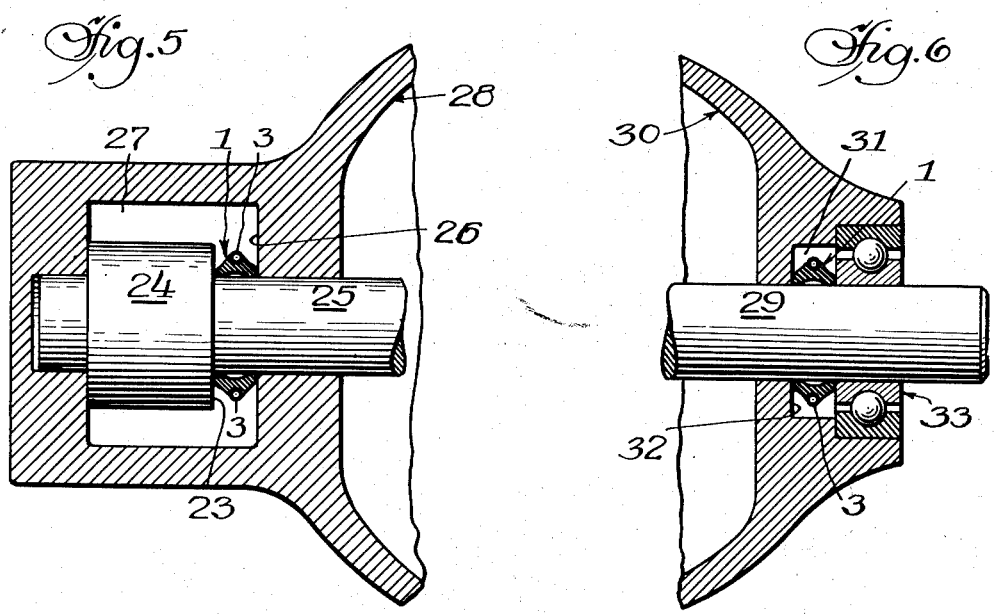
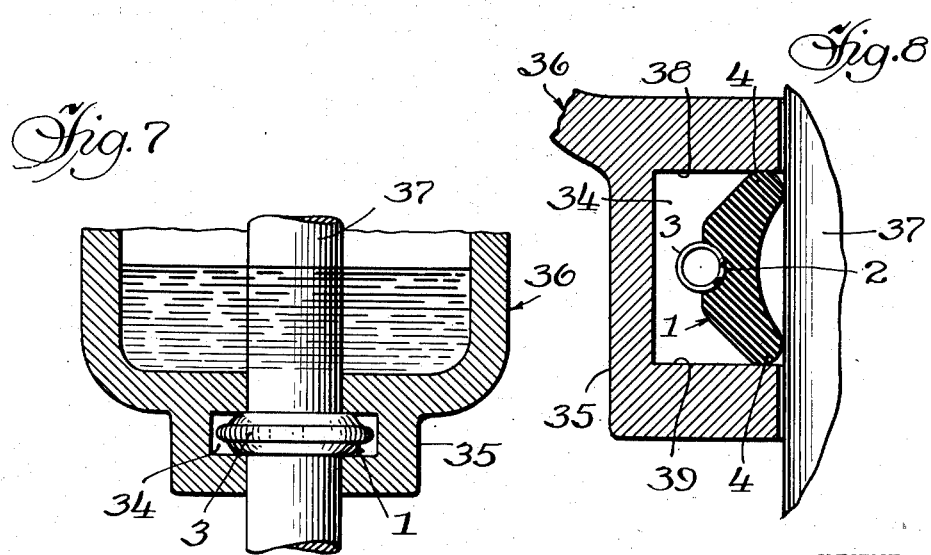
Thomas R. Smith, INVENTOR.

Patented Oct. 21, 1952

2,614,869

UNITED STATES PATENT OFFICE 2,614,869

SPRING-ACTUATED SHAFT SEAL

Thomas R. Smith, Newton, Iowa, assignor to The Maytag Company, Newton, Iowa, a corporation of Delaware Application November 1, 1946, Serial No. 707,070

1 Claim. (Cl. 286—5)

The present invention relates to a novel seal assembly and especially to a spring-actuated seal and it has for an object to provide improved apparatus of the character set forth.

Among the objects of the present invention is to provide a novel sealing element adapted to encompass a relatively movable shaft and the seal is freely mounted within an annular inwardly opening channel in an enclosure or housing. In the novel embodiment, the sealing element is of crescent-shape in annular cross-section or arched in such manner as to provide spaced sealing lips having sealing contact not only with the shaft but it is also maintained in sealing contact with the opposite sides of the groove or channel provided in the encompassing housing.

The invention further comprehends a novel arch-shaped sealing member normally of greater width than the width of the annular channel in which it is mounted, whereby when the seal is assembled in position its width is decreased and its central portion is caused to hump or arch outwardly thereby compressing the member. Due to this humped condition and by employing a contractile garter spring disposed upon the outer diameter of the arch, uniform compression is applied to the spaced sealing lips. By forming the sealing element of a flexible composition, these sealing lips are always maintained in sealing contact under any and all conditions to which the seal is subjected in use. In addition, this novel construction and arrangement compensates for any wear on the sealing lips and thereby greatly prolongs the life and service of the seal.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment it is to be understood that the same is susceptible of modification and change and comprehends other details, arrangements of parts, features and constructions without departing from the spirit of the invention.

In the drawings:

Figure 1 is a fragmentary view in perspective of the novel sealing element.

Fig. 2 is a view in vertical cross-section of a pair of connected housings and showing two methods of applying the novel seal and its relationship with the shaft to be sealed.

Figs. 3 and 4 are fragmentary views in vertical cross-section showing alternate embodiments or forms of application of the sealing element in a stamping or retaining shell press fitted into the encompassing housing.

Fig. 5 is a fragmentary view in vertical cross-section showing the novel seal assembled upon a shaft and disposed between a shoulder on this shaft and the inside of an interior wall of the housing.

Fig. 6 is a fragmentary view in vertical cross-section of the seal applied to a shaft and mounted between a ball bearing retainer and a shoulder or wall provided in the housing.

Fig. 7 is a fragmentary view in vertical cross-section through another form of housing and showing the seal in end elevation and mounted within an annular groove or channel machined out of the end of the housing.

Fig. 8 is an enlarged fragmentary view of Fig. 7 but showing the sealing element in vertical cross-section.

In the drawings are shown illustrative embodiments of the novel seal constructions and disclosing a few of its many applications, either as an assembled unit in a retaining shell or stamping or mounted directly within the encompassing housing.

Referring more particularly to the drawings, Fig. 1 shows the disassembled annular sealing element I formed or constructed of a suitable resilient or flexible material, for example, natural or compounded synthetic rubber or other rubber-like or flexible material. This sealing element is of substantially crescent-shape in annular cross-section with the outer portion or external diameter preferably provided with an annular recess or outer circular groove 2 for the reception of a contractile or garter spring 3 and the inner portion or internal diameter with an inwardly facing circular groove. At each of its opposite edges this sealing element is provided with a sealing lip 4 of rounded contour for insuring sealing contact with a shaft 5.

The shaft 5 may be vertically arranged as in Fig. 2, or it may be disposed in a horizontal or other plane. As shown in Fig. 2, the shaft is mounted for rotation or reciprocation within a pair of connected housings or casings 6 and 7 and it passes from housing 6 into and through housing 7. The sealing element I is shown mounted in an annular recess or groove 8 provided in the abutting ends 9 and 10 of adjacent surfaces on the housings 6 and 7, respectively. These abutting ends are shown rigidly connected by bolts or other attaching means 11.

The width of the sealing element 1 is, prior to assembly, preferably initially greater than the width of the receiving channel 8, so that when it is positioned therein its arched contour is increased thereby applying compression forces in the seal member. Also the internal diameter of the sealing member is preferably somewhat less than the diameter of the shaft 5, so that when it is assembled on the shaft there is a natural tendency for the lips 4, 4 of the sealing element to contact or grip the shaft. These features along with the contractive force of the garter spring 3 cause the sealing lips 4, 4 to engage the corners formed by the opposite sides or side walls of the annular channel 8 and the outer diameter of the shaft 5 to thereby assure effective sealing contact at these points under all conditions of operation.

In the embodiment shown, this seal is employed to separate and/or prevent the intermixing of the fluids disposed in the two housings 6 and 7. It is to be noted that no anchoring means for this seal is provided other than the friction engagement of the shaft and side walls of the channel. It may under certain conditions rotate with the shaft or remain stationary, depending upon various operating conditions. On the exterior and lower end of the housing 7 another sealing element 1 is mounted about the shaft 5. However, in this case a separate retaining shell or stamping is provided for the seal and it is affixed to the exterior lower end of the housing 7. This shell consists of a cup-shaped member 12 having an external flange 13 secured to the housing by bolts or other attaching means 14, and a centrally disposed opening for the shaft. Thus a channel 15 is provided in this assembly similar to the channel 8 to cause the sealing element to bow or hump outwardly when mounted in operative position. The function of this assembly is the same as that previously mentioned.

In Fig. 3 there is shown a modified channel structure 17 for one of the sealing elements 1. This seal is maintained in position on the shaft 16 and retained in the channel 17 by a shoulder or wall 18 formed in a housing 19, and an angular retaining member or stamping 20 pressed into place in the opening or offset in the housing. The sealing member is forced into the channel formed by the vertical wall of the stamping 20 and the wall 18 of the housing.

A somewhat similar arrangement to that shown in Fig. 3 is provided in the embodiment shown in Fig. 4, except that an annular channel or groove 21 is provided in an inwardly opening retaining shell or stamping 22 press fitted into an opening or offset of the housing 19. In this construction the opposite edges of the sealing element are compressed between and bear against the opposite walls of the retaining shell or stamping 22.

In Fig. 5, the sealing element 1 is assembled in a channel formed between a shoulder 23 of an enlargement 24 on the shaft 25 and the interior wall 26 in an opening 27 adjacent the end of a housing 28.

Fig. 6 shows a further embodiment in which the sealing member or element 1 is mounted on or about a shaft 29 in an opening in the end of a housing 30. The seal is disposed in an annular channel or groove 31 formed between a shoulder 32 in the housing and a ball bearing retainer 33 pressed into the end of the housing.

In Figs. 7 and 8 there is disclosed another embodiment in which the sealing element 1 is mounted in a preformed channel or groove 34 machined in the end 35 of a housing 36. The resilient seal may in this instance be inserted and positioned in the channel by forcing it through the shaft opening, and after positioning the seal the shaft 37 is inserted through the shaft opening and the inside diameter of the sealing element. The sealing effect produced thereby is shown more clearly in Fig. 8 where the sealing lips 4, 4 engage the shaft at spaced points. In addition, the outer rounded edges of these sealing lips engage the opposite walls 38 and 39 of the channel and thereby effect maximum sealing contact for preventing leakage as well as preventing the passage of dust or dirt particles. The sealing features as shown in this enlarged view is applicable to all of the other modifications which are shown on a reduced scale.

From the above description and the disclosure in the drawings, it will be apparent that the present invention comprehends a novel seal and assembly in which the resilient sealing element is of arched or crescent-shape in annular cross-section and provided with spaced sealing lips of rounded contour for sealing contact with a rotary or reciprocating shaft and with the opposite sides of a channel or groove in which the sealing member is mounted. Also, these lips are maintained in sealing contact by a contractile or garter spring which is mounted upon the outer upper portion of the seal. In each of the various assemblies or embodiments shown, the seal is placed without anchoring means into a channel or annular groove formed between spaced walls. These walls may be formed or provided in the housing surrounding the shaft to be sealed, or with the housing providing one of the walls and a retaining shell or stamping, bearing or shoulder provided on the shaft forming or providing the other wall. In each instance, the channel or groove so formed is of less width than the width of the sealing element, and the internal diameter of the sealing member is initially less than the diameter of the shaft to be sealed, so that when the sealing member is mounted in the channel it humps or bows outwardly to a greater degree than its initial contour. It will thus be evident that with this manner of mounting, the force of the garter spring and the resiliency or flexibility of the sealing element all combine to maintain the sealing action at all times not only upon the shaft to be sealed but also against the walls or surfaces forming the channel. The seal adjusts itself and any wear to which the seal is subjected in use is compensated for by this novel construction and arrangement so that optimum sealing is effected over a long period of time.

Having thus disclosed my invention,
I claim:

A seal assembly for sealing the space between a shaft and a housing in which said shaft extends, comprising an annular channel having side walls associated with said housing and opening inwardly toward said shaft, a freely mounted resilient seal of crescent-shape in annular cross-section adapted to be received within said channel and encompassing the shaft, said seal comprising a continuous, integral sealing element having spaced rounded sealing lips at its end portions and a pair of oppositely facing inner and outer intermediate circular grooves, said sealing element being initially of greater width than the width of said channel whereby the sealing element is further arched when mounted in position in said channel, the inner groove being of greater cross section than said outer groove, and a contractile spring mounted in said outer groove portion for exerting a force upon said sealing element for pressing the sealing lips into contact with said shaft and the opposite side walls of said channel, with the remainder of the sealing element being free of said annular channel.

THOMAS R. SMITH.

REFERENCES CITED

The following references are of record in the file of this patent:

UNITED STATES PATENTS

| Number | Name | Date |
|---|---|---|
| 225,269 | Brownell | Mar. 9, 1880 |
| 546,732 | Desserich | Sept. 24, 1895 |
| 1,822,722 | Bell | Sept. 8, 1931 |
| 2,091,739 | Pesarese | Aug. 31, 1937 |
| 2,237,758 | Kurzweil | Apr. 8, 1941 |
| 2,361,794 | Pryor | Oct. 31, 1944 |

FOREIGN PATENTS

| Number | Country | Date |
|---|---|---|
| 340,081 | Italy | of 1936 |